United States Patent
Ali Khan et al.

(10) Patent No.: US 12,387,048 B2
(45) Date of Patent: Aug. 12, 2025

(54) APPARATUSES AND METHODS FOR TEXT CLASSIFICATION

(71) Applicant: Huawei Technologies Co., Ltd., Shenzhen (CN)

(72) Inventors: Suleiman Ali Khan, Kista (SE); Simone Romano, Kista (SE); Mika Juuti, Kista (SE); Vladimir Poroshin, Kista (SE); Adrian Flanagan, Helsinki (FI); Kuan Eeik Tan, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 17/980,992

(22) Filed: Nov. 4, 2022

(65) Prior Publication Data

US 2023/0080261 A1   Mar. 16, 2023

Related U.S. Application Data

(63) Continuation of application No. PCT/EP2020/062449, filed on May 5, 2020.

(51) Int. Cl.
*G06F 40/30* (2020.01)
*G06N 5/022* (2023.01)

(52) U.S. Cl.
CPC ............. *G06F 40/30* (2020.01); *G06N 5/022* (2013.01)

(58) Field of Classification Search
CPC ...... G06F 40/216; G06F 40/279; G06F 40/30; G06N 3/08; G06N 5/022
See application file for complete search history.

(56) References Cited

U.S. PATENT DOCUMENTS

| | | | |
|---|---|---|---|
| 8,868,402 B2 | 10/2014 | Korolev et al. | |
| 9,836,455 B2 * | 12/2017 | Martens | G06F 40/279 |
| 11,182,545 B1 * | 11/2021 | Tsai | G06N 20/10 |
| 11,657,222 B1 * | 5/2023 | Anthony | G06F 40/279 |
| | | | 706/12 |
| 11,748,613 B2 * | 9/2023 | Li | G06N 3/04 |
| | | | 704/9 |
| 2013/0138735 A1 | 5/2013 | Kanter et al. | |

(Continued)

FOREIGN PATENT DOCUMENTS

| | | | | |
|---|---|---|---|---|
| CN | 108363753 A | * | 8/2018 | G06F 16/35 |
| CN | 110222182 A | * | 9/2019 | A63F 13/70 |

(Continued)

OTHER PUBLICATIONS

Craig Bloem, "84 Percent of People Trust Online Reviews As Much As Friends. Here's How to Manage What They See," Jul. 31, 2017, 12 pages, Inc.com.

(Continued)

*Primary Examiner* — Mohammad K Islam
(74) *Attorney, Agent, or Firm* — Slater Matsil, LLP (57) ABSTRACT

Apparatuses and methods are provided for classifying textual content using a text classifier for determining to which class the textual content belongs. After classification, the text classifier provides the classification result and a context relevant to the classification result to an explanation system. The explanation system predicts, from the classification result and the context relevant to the classification result, one or more reasons behind the classification result.

17 Claims, 3 Drawing Sheets

(56) References Cited

U.S. PATENT DOCUMENTS

| | | | | |
|---|---|---|---|---|
| 2018/0308487 A1* | 10/2018 | Goel | ............... | G10L 15/1815 |
| 2018/0365248 A1* | 12/2018 | Zheng | ............... | G06F 40/216 |
| 2020/0042580 A1* | 2/2020 | Davis | ............... | G06F 16/93 |
| 2020/0111023 A1* | 4/2020 | Pondicherry Murugappan | ........... | |
| | | | | G06N 5/02 |
| 2020/0311205 A1* | 10/2020 | Büttner | ............... | G06F 40/216 |
| 2021/0201018 A1* | 7/2021 | Patel | ............... | G06F 18/22 |
| 2021/0209142 A1* | 7/2021 | Tagra | ............... | G06N 3/044 |
| 2023/0004604 A1* | 1/2023 | Li | ............... | G06N 3/096 |
| 2023/0069587 A1* | 3/2023 | Lukyanenko | ........... | G06F 40/35 |
| 2023/0139831 A1* | 5/2023 | Wang | ............... | G06V 30/1444 |
| | | | | 704/9 |

FOREIGN PATENT DOCUMENTS

| | | | | |
|---|---|---|---|---|
| EP | 3518142 A1 | 7/2019 | | |
| WO | 2017162919 A1 | 9/2017 | | |
| WO | WO-2019050968 A1 * | 3/2019 | ........... | G06F 16/353 |
| WO | WO-2019175571 A1 * | 9/2019 | ......... | G06F 16/3329 |

OTHER PUBLICATIONS

Jacob Devlin et al., "BERT: Pre-training of Deep Bidirectional Transformers for Language Understanding," May 24, 2019, 16 pages, https://arxiv.org/abs/1810.04805.

Casey Newton, "Bodies in Seats," Jun. 19, 2019, 21 pages, Vox Media, LLC.

Haizhou Du et al., "Hierarchical Gated Convolutional Networks with Multi-Head Attention for Text Classification," The 2018 5th International Conference on Systems and Informatics (ICSAI 2018) Nov. 10, 2018, 6 pages, IEEE Xplore.

* cited by examiner

APPARATUSES AND METHODS FOR TEXT CLASSIFICATION

CROSS-REFERENCE TO RELATED APPLICATIONS

This application is a continuation of International Application No. PCT/EP2020/062449, filed on May 5, 2020, which is hereby incorporated by reference in its entirety.

TECHNICAL FIELD

Generally, the following disclosure relates to the field of electronic devices capable of executing computer programs. More specifically, the following disclosure relates to apparatuses and methods for text classification.

BACKGROUND

Modern computers and computing capable devices, such as mobile phones, cars and household appliances, are often provided with a possibility to execute third-party computer applications. Many of these computer applications provide a possibility for interaction between different persons using social media applications. For example, a first person may acquire images of a holiday trip and publish these images using a social media platform, or other similar service. The publisher may also include comments in the publication.

It is common that other users of the social media platform may be allowed to comment the published images and possible earlier comments. These comments are typically analyzed so that publication of undesired comments can be prevented. For example, the published original may include a comment comprising illegal content or the comments provided by other users may be rude, offensive or against the rules set by the platform operator.

Earlier social media platforms were relying on use of human moderators who approved or disapproved comments either before or after publication. The volumes of such comments have increased significantly and computer-based approaches have been developed. In a computer-based approach, a text classifier using a machine learning arrangement is commonly used. The machine learning arrangement based text classifier is trained so that it is capable of indicating, for example, if a comment being analyzed is acceptable or inacceptable.

The text classifier is typically trained using a very large corpus in an unsupervised manner. In this disclosure, unsupervised learning is used to mean a type of machine learning algorithm, which is used to draw inferences from datasets consisting of input data without pre-existing labels. The unsupervised learning can be called pre-training as it is typically supplemented with supervised learning. The supervised learning uses input data that has been labeled by trained humans for the task of identifying acceptable and unacceptable comments. The conventional text classifiers are able to provide a correct classification result in a manner that a trained human understands why the comment was classified as acceptable or unacceptable.

As the amount of social media content and the like increases, there is a need for improved text classification.

SUMMARY

Apparatuses and methods are provided for classifying textual content using a text classifier for determining which class the textual content belongs to. After classification, the text classifier provides the classification result and the context relevant to the classification result to an explanation system. The explanation system predicts, from the classification result and the context relevant to the classification result, one or more reasons behind the classification result. When the reasons are known, the classification result is easier to understand and the users of a social media service or similar have a better understanding why their comment or other textual content was rejected.

The foregoing and other objectives are achieved by the subject matter of the independent claims. Further implementation forms are apparent from the dependent claims, the description and the figures.

In a first aspect, a method for determining a reason for text classification is disclosed. The method comprises: receiving a text input to be classified; predicting, using a text classifier, a class of the text input; extracting a context relevant to a prediction result; determining one or more reasons for the prediction result based on the extracted context; and providing the prediction result and the determined one or more reasons as a classification result.

It is beneficial that the reason for text classification can be determined so that users presented with the classification result can understand why the classification is done. This can be achieved by identifying, from the received input, the context relevant to the decision and predicting from the relevant context what the actual reason for the classification was. This also leads to an improved user experience because users trust automated decisions. Furthermore, human moderators are enabled to provide better informed decisions. The reasons facilitate cultural-specific moderation and also allow to better take into account the legal issues pertaining to moderation of particular content.

In a first implementation of the first aspect, the extracting the context relevant to the prediction result comprises identifying the context relevant to the prediction result, wherein the identifying comprises selecting input words that are the most relevant to the prediction using an interpretive multi-head attention module. It is beneficial to use a multi-head attention module, as the multi-head attention module can attend to several inputs and select the most relevant one.

In a second implementation of the first aspect, the determining one or more reasons for the prediction result comprises determining, using a machine learning arrangement, one or more reasons for the prediction result based on the identified context, further using a reason classifier and a knowledge base for predicting the reasons for classification. It is beneficial to use a knowledge base, as it can be used to fine-tune the reasons, particularly in a case wherein the reason determination is uncertain. This improves the correctness of the reasoning, and thus reduces a need for human intervention in the matter.

In a third implementation of the first aspect, the predicting the reasons for classification comprises expanding the identified context using a knowledge base comprising semantical relationships of words. It is beneficial to expand the identified context, as it is easier to determine the correct reasons based on the expanded identified content. This increases the correctness of the reason determination when the determination is based on larger groups of words having semantical relationships.

In a fourth implementation of the first aspect, the method further comprises computing a value representing a confidence of the prediction result and the determined one or more reasons. It is beneficial to compute a value or a coefficient representing a confidence of the prediction. This helps to determine if there is a need to use the knowledge base or a human moderator. This improves the correctness of decisions and reduces the need for human work.

In a fifth implementation of the first aspect, the method further comprises comparing the computed value against a threshold and forwarding the text input, the prediction result, and the one or more reasons to a system operator when the computed value is lower than the threshold. It is beneficial to determine a threshold value for the computed value representing confidence, so that it is easy to determine if the determined reasons must be fine-tuned or reviewed.

In a sixth implementation of the first aspect, the method further comprises generating an explanation based on the one or more reasons. It is beneficial to provide the users with an explanation instead of one or more reasons, as the purpose is to improve the understanding of the classification result.

In a seventh implementation of the first aspect, the text classifier is a language-representation based neural network. It is beneficial to use a language-representation based neural network, as they are effective in classifying text.

In a second aspect, a computer program comprising computer program code is disclosed. The computer program code is configured to perform a method as described above when the computer program code is executed in a computing device. It is beneficial to use a computer program to achieve the benefits and technical effects discussed above.

In a third aspect, an apparatus for determining a reason for text classification is disclosed, the apparatus comprising processing circuitry configured to: receive a text input to be classified; predict, using a text classifier, a class of the text input; extract a context relevant to a prediction result; determine one or more reasons for the prediction result based on the extracted context; and provide the prediction result and the determined one or more reasons as a classification result.

It is beneficial that the reason for text classification can be determined so that users presented with the classification result can understand why the classification is done. This can be achieved by identifying, from the received input, the context relevant to the decision and predicting from the relevant context what the actual reason for the classification was.

In a first implementation of the third aspect, the processing circuitry of the apparatus, when extracting the context relevant to the prediction result, is configured to identify the context relevant to the prediction result, wherein the identifying comprises selecting input words that are most relevant to the prediction using an interpretive multi-head attention module. It is beneficial to use a multi-head attention module, as the multi-head attention module can attend to several inputs and select the most relevant one.

In a second implementation of the third aspect, the processing circuitry is further configured to determine one or more reasons for the prediction result by determining, using a machine learning arrangement, one or more reasons for the prediction result based on the identified context, further using a reason classifier and a knowledge base for predicting the reasons for classification. It is beneficial to use a knowledge base, as it can be used to fine-tune the reasons, particularly in a case wherein the reason determination is uncertain. This improves the correctness of the reasoning, and thus reduces a need for human intervention in the matter.

In a third implementation of the third aspect, the processing circuitry is further configured to expand the identified context using a knowledge base comprising semantical relationships of words. It is beneficial to expand the identified context, as it is easier to determine the correct reasons based on the expanded identified content. This increases the correctness of the reason determination when the determination is based on larger groups of words having semantical relationships.

In a fourth implementation of the third aspect, the processing circuitry is further configured to compute a value representing a confidence of the prediction result and the determined one or more reasons. It is beneficial to compute a value or a coefficient representing a confidence of the prediction. This helps to determine if there is a need to use the knowledge base or a human moderator. This improves the correctness of decisions and reduces the need for human work.

In a fifth implementation of the third aspect, the processing circuitry is further configured to compare the computed value against a threshold and forward the text input, the prediction result, and the one or more reasons to a system operator when the computed value is lower than the threshold. It is beneficial to determine a threshold value for the computed value representing confidence, so that it is easy to determine if the determined reasons must be fine-tuned or reviewed.

In a sixth implementation of the third aspect, the processing circuitry is further configured to generate an explanation based on the one or more reasons. It is beneficial to provide the users with an explanation instead of one or more reasons, as the purpose is to improve the understanding of the classification result.

The principles discussed in the present disclosure can be implemented in hardware and/or software.

BRIEF DESCRIPTION OF THE DRAWINGS

Further example embodiments will be described with respect to the following figures, wherein.

In the figures, identical reference signs will be used for identical or at least functionally equivalent features.

DETAILED DESCRIPTION OF ILLUSTRATIVE EMBODIMENTS

In the following description, reference is made to the accompanying drawings, which form part of the disclosure, and in which are shown, by way of illustration, specific aspects in which the present apparatuses and methods may be provided. It is understood that other aspects may be utilized and structural or logical changes may be made without departing from the scope of the claims. Thus, the following detailed description is not to be taken in a limiting sense.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

In the following description, detailed and very specific example are given. These examples should be understood to be a description of one possible way of implementing the text classification. In the examples a machine learning based classifier for textual data is a model that takes text as input and predicts a class or multiple classes as output. The model is learned by the machine by analyzing many examples of texts belonging to the different classes that we want to predict.

The classifier represents text in a numerical fashion in order to be processed. There exist different types of text representations. These are two examples of text representations:

A) Bag of words representation: a text is represented by the frequency of the words that it contains. Only words from a given dictionary are considered in the model. E.g. "this is a text" will be represented as [1, 1, 0] where each position counts respectively the frequency of the words [this, text, cat], where [this, text, cat] is the given dictionary.

B) Term frequency-inverse document frequency representation: a text is represented by the frequency of the words it contains as in the bag or words model. However, the frequency of words that are common gets penalized. E.g. "this is a text" will be represented as [1, 0.01, 0] according to the dictionary [this, text, cat], "the" is a very common word and thus it gets penalized. Even if these two are particularly mentioned, also other text representations may be used.

Accordingly, there are different machine learning based classifiers that can be used. In the following, some examples are given:

A) Neural networks: the class is predicted by a network of interconnected neurons. Neurons are units that perform mathematical operations. Neurons in a neural network are organized in hierarchical fashion. The numerical representation fed to the network is processed by the neurons to predict the class.

B) Decision trees: the class is predicted by iteratively answering questions on the input data following a flowchart like model.

C) Decision forests: the predicted class is obtained by majority voting out of the prediction of multiple independent decision trees.

D) k nearest neighbors: the input text is classified according the k most similar text examples. The rationale behind this is that examples that are similar should belong to the same class.

E) Support vector machines: the class is predicted by identifying which part of the hyper-dimensional space defined by the text representation the input text belongs to. Support vector machines are a mathematical way to divide the hyper-dimensional space for different classes.

F) Naïve Bayes: these types of classifiers are probabilistic classifiers based on the Bayes' rule. In the following example a neural network based classifier is used both for text classification and reason classification, however, any other classifier mentioned above, or similar to them, could be used.

Figure 1:
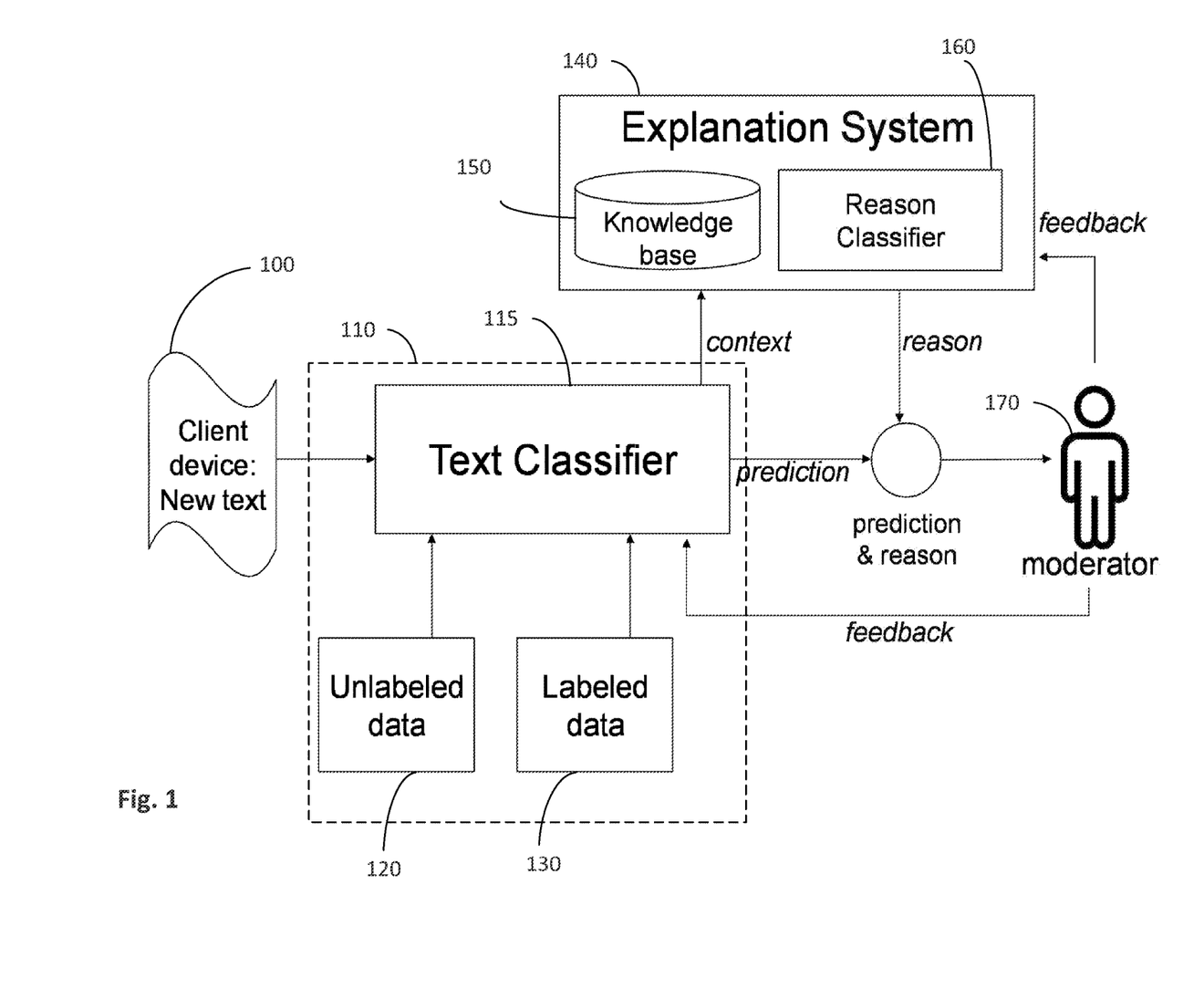
FIG. 1 shows an example of a block diagram of an arrangement for determining reasons for text classification.

FIG. 1 discloses an example of an arrangement for determining reasons for text classification. In the example of FIG. 1, a client device 100 is used to provide a text input to be classified. A common example of providing a text input for classification is publishing a comment on a social media platform; however, the text input may be classified for any other purpose. The analysis may be done in order to verify if the comment is appropriate for publication; however, the example of FIG. 1 is not limited to social media and the like. The example of FIG. 1 may be used for all kinds of classification where the reasons for the classification decision are desired. For example, the example arrangement could be used for classifying scientific texts into different classes or subclasses. The reasoning behind the classification can be useful, particularly when the classes are similar to each other. In that case it is beneficial to understand why a particular class was chosen.

The client device 100 used in the example of FIG. 1 can be a mobile device, such as a mobile phone, tablet computer or other portable device, or an ordinary computer comprising a processor, at least one memory and a network connection. The person providing a comment on the social media platform uses a device that includes a suitable application or provides another interface to the social media platform. The user of the client device may provide the input in the form of a written comment or use voice commanding, so that the device will produce the text input. The client device 100 is connected to the Internet using a local area network, mobile network or any other suitable network connection that can be used for providing access to the social media platform.

The text input is received at a server 110 providing the text classifying. The server 11o comprises a circuitry capable of executing computer programs and storing the related data. The circuitry may comprise one or more processors and one or more memories. The server 11o can be a part of the social media platform or an independent service that receives text inputs from the social media platform. For the sake of clarity, in the example of FIG. 1, the text input is provided from the client device 100 to the server 11o. The server may be an ordinary server dedicated for the text classifier or shared with a different functionality. Instead of a physical server, a logical server, a portion of a cluster of servers or a cloud may be used. In the example of FIG. 1, the server comprises a neural network that has been trained using both unsupervised training providing unlabeled data 120 and supervised training providing labeled data 130. The unsupervised training is typically performed with a large set of words in order to learn a language representation. The unsupervised training can be performed only once, or it may be repeated. The supervised training is typically performed on much smaller sets comprising data that have been labeled by expert human annotators. This process is commonly revised continuously. Thus, when an expert human annotator reviews comments, he or she can confirm the classification or make corrections. Confirmation and/or correction can be fed back to the neural network as feedback. Thus, the classification result improves continuously.

In the example of FIG. 1, the text classification is based on a deep language model. The deep language model is a stack of layers based on multi-head attention modules. Multi-head attention allows the model to jointly attend to information from different inputs. The multi-head attention module selects the inputs that are the most relevant to the task at hand. Based on an input sentence, the model learns which inputs it needs to attend to, and by doing so, the multi-head attention module learns which words are relevant to the task at hand. The deep language model identifies the multi-head attention importance of each word $H_w$ as a normalized aggregate over the attention head weights from words to prediction. $H_w$ is a vector where each position represents the importance of each word according to the attention mechanism.

In the example of FIG. 1, the server 11o employs an adversarial approach for filtering the important keywords.

The server works as an adversary that removes each word in a sentence and computes the prediction probability $p_w$ of the sentence when the word w got removed. Given the prediction probability $p_s$ of the whole sentence, the server identifies the adversarial importance of each word $A_w$ as:

$$I_w = p_s - p_w$$

$$A_w = I_w / \Sigma I_j$$

where j=1 to n, the total number of words in the sentence.

Finally, a gradient based filter $D_w$ for identifying important words is introduced. $D_w$ is defined as the normalized gradient of each word for the prediction as:

$$d_w = dL/dw$$

$$D_w = d_w / \Sigma d_j$$

where j=1 to n, the total number of words in the sentence.

The server 110 then extracts the context of the text as the most predictive words as an aggregate ensemble: ensemble ($A_w$, $H_w$, $D_w$), represented as feature extraction FE. The ensemble is embodied as a weighted average of the components: $alpha_A * A_w + alpha_H * H_w + alpha_D * D_w$. These words form the context C of the classification and are sent to the explanation system 140 to infer the reason of the classification. Thus, the context C is the context relevant to the classification result and extracted after being identified being relevant to the classification result.

The explanation system 140 comprises a reason classifier 16o and a knowledge base 150. The reason classifier 16o is a machine learning based classifier. In the example of FIG. 1, it is a deep neural network based multi-class classifier. The neural network is trained on labeled data of several reasons to predict probabilities for classifying the text for each of the multiple reasons. The reason classifier 16o uses the context C of the classification instead of the whole text for reason identification. Traditionally, the text classifiers predict a target class: e.g. a proper/improper class. In the example of FIG. 1, the text classifier 115 also identifies the context responsible for the prediction, which is then used by the reason classifier 16o. Using the context for prediction has an advantage, as it helps the reason classifier 16o to focus on parts of the text that are relevant to the original classification. For texts that are longer than a few words, this brings in a substantial advantage of reducing the need for large labeled data sources for training the reason classifiers 160.

The explanation system 140 can use the knowledge base 150 for expanding the context C, which is the context identified to be relevant with regard to the classification result. The expanding may comprise generating a supplementary context using, for example, synonyms for used words. For example, if the comment written by the user was "This text is dumb", it could be classified as improper. In this case, the relevant context C would most probably be the word "dumb". Expanding this could provide synonyms or the similar meaning words "idiotic", "stupid", or "moronic". By expanding the context, the reasons can be determined from a larger group of words, which are used for the similar meaning. The expanding does not necessarily include all possible synonyms but may be limited to those that are the most commonly used in a manner that is considered to be inappropriate. These manners include, for example, an offensive and insulting use of words, while more polite ways meaning the same could be considered appropriate.

The reason classifier 160 of the example of FIG. 1 is trained using partially labeled data from a knowledge base 150. The data consists of a graph of words (nodes) linked together (edges) with NR reason labels, where NR is the number of possible reasons for explanation. The NR reason labels are available for some of the nodes only. The graph of words is constructed using the words' semantic relationships such as a synonym, an antonym, a hypernym and a hyponym from a comprehensive knowledge base 150. Each node in the graph is also associated with a word embedding which encodes additional information about it.

The reason classifier 160 is then defined as a graph convolutional neural network (GCN), which is configured to learn the prediction outcome based on an input graph. Given a graph G, the reason classifier GCN takes as input a word embedding for each node, summarized as a N×S matrix W, and the links in the graph structure as an adjacency N×N matrix A. N is the number of nodes in the graph and S is the size of embeddings. The output of the reason classifier 160 GCN is then represented as N×NR matrix of reasons: O=GCN(W,A). Given the context C, the explanation system E then identifies the key reasons for prediction as R=E(C), where E(C)=predict.GCN(W,A,C).

Finally, given a new text X, the text classifier 115 predicts the text class y=M(X). The method then identifies the most important words for classification as context C=FE(M,X,y). The explanation system uses the context then to predict the reasons R=E(C).

Another challenge of the conventional approaches has been the availability of labeled training data for a comprehensive reason ontology. The data are either scarce or not available at all. The example of FIG. 1 overcomes this challenge by using a knowledge base 150 for a deeper background information-driven classification. The knowledge base 150 is built as a graph which enriches the context of the text to predict the likely reason. Together with the knowledge base 150 and reason classifier 16o, the example arrangement of FIG. 1 achieves a better understanding of the input text and identifies the reason R for classification decision.

FIG. 1 shows the accumulation of reasons from the explanation system and the prediction from the text classifier 115. If required, the classification and the reason are reviewed by a human moderator 170. Otherwise, automatic moderation decision making is carried out. Feedback from the moderator is sent back to the text classifier 115 and the explanation system 140 to improve their prediction accuracies.

Figure 2:
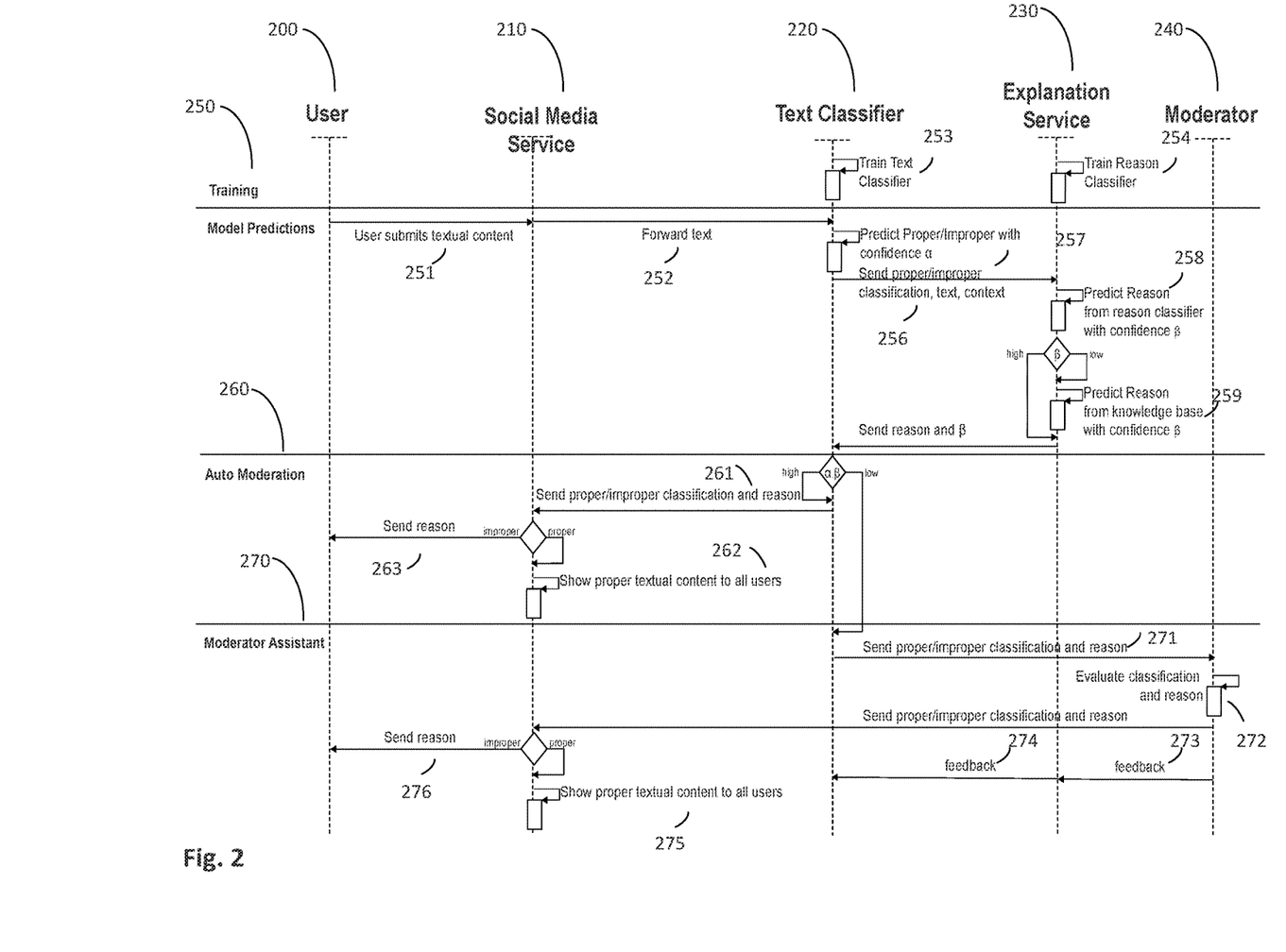
FIG. 2 shows an example of signaling of a neural network based classifier.

FIG. 2 shows an example of signaling of a neural network based classifier. The signaling could be applied in an arrangement similar to the example of FIG. 1, however, it does not need to be exactly similar. It is sufficient that the arrangement is used for classifying and determining the reasons for the classification. In the example of FIG. 2, a user 200 is communicating with a social media service 210. For example, the user 200 may send comments relating to an image posted by another user. The social media service 210 provides the received comments to a text classifier 220, which is working in association with an explanation service 230 and a moderator 240. In the following, the signaling in the example is explained.

In the example of FIG. 2, the user 200 submits textual content into a social media service. In an alternative embodiment, the content may be, for example, speech in the form of a sound or a figure. The principles explained below can also be applied to different types of input, provided that there is a need for classification, for example between proper and improper, and there is also a need to provide reasons for the classification decision. Thus, the speech may be recognized and converted into text, or an image content may be recognized using suitable algorithms.

In the example of FIG. 2, the social media service 210 provides the text received from the user to the text classifier 220. The text classifier 220 is a machine learning based entity, which has been trained 253 using both unsupervised and supervised learning. Unsupervised learning is commonly used in training machine learning based entities, because it improves the quality of the predictions. However, this is optional and commonly performed before the text classifier 220 is used in production. The training 253 also continues when the text classifier 220 is used for classifying textual content provided by the users. The training during production use is based on supervised training, wherein a person trained to evaluate textual contents decides if the text classifier 220 has made a correct classification decision or not.

When the text classifier receives the textual content it first predicts if the textual content belongs to the proper or improper class. The text classifier also determines a confidence coefficient alpha. The text classifier also identifies which portion of the textual content was relevant to making the decision, extracts it and provides 257 the classification decision and the relevant textual content, context, to the explanation service 230.

The explanation system 230 is trained 254 accordingly with the text classifier 220. The training may comprise supervised and unsupervised training and it is continued in a supervised manner when the text classifier 220 is used for classifying textual content coming from the actual users. The explanation service predicts 258 from the received context what is the reason for the classification result and determines a confidence coefficient beta. If the beta shows a low confidence, the prediction result may be fine-tuned 259 using a knowledge base. Then, the reason and the beta are sent to an auto moderation phase 260.

The confidence coefficients alpha and beta determine if the received textual content can be moderated automatically. If the coefficients show a low value, the classification result and the reasons are sent to a moderation assistant phase 270. If the confidence coefficients alpha and beta show a high confidence, the classification result is provided back 261 to the social media service 210 with the determined reasons. There may be one or more reasons. If the textual content is classified as being improper, the reasons are provided 263 to the user 200. If the textual content is classified as being proper, the textual content is shown 262 to all users of the social media service 210 according to the user's desired access rights. Thus, the visibility of the comment may be limited, if the user has decided to show the comment to his or her connections, such as friends or friends of friends.

If the confidence coefficients show a low confidence, the classification result and the reasons are sent 271 to the moderator 240. The moderator 240 evaluates 272 the classification and the reasons, which are sent back to the social media service 210. The decision made by the moderator 240 is sent as feedback 273, 274 to the explanation service 230 and the text classifier 220. The feedback may be confirming that the classification result is correct or incorrect. Accordingly, it is confirmed if the reasons are correct or incorrect. The social media service 210 then acts as in the auto moderation mode and shows 275 the proper content or sends 276 at least one reason to the user, explaining that the content was classified as being improper.

Figure 3:
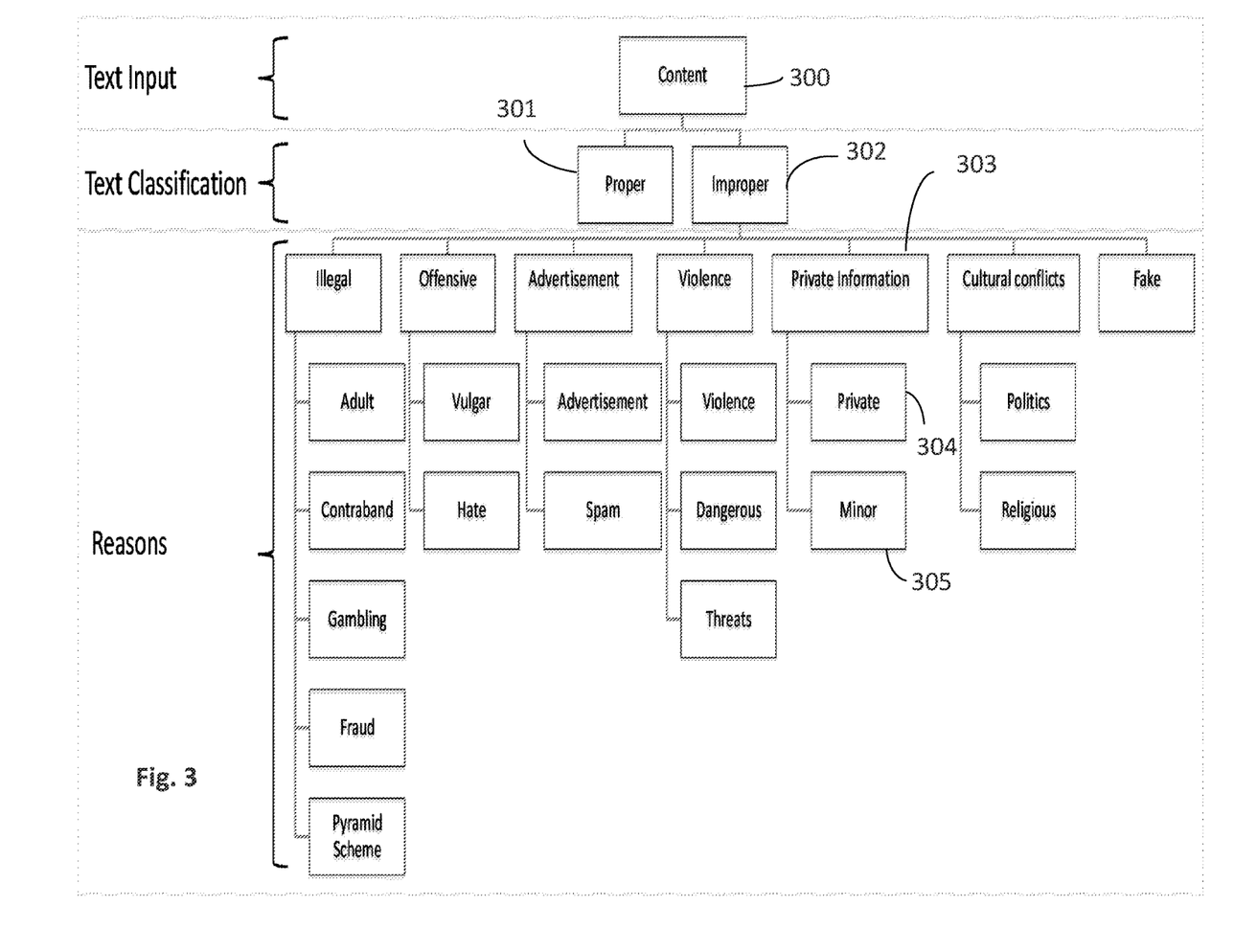
FIG. 3 shows a detailed example of an ontology of reasons.

FIG. 3 illustrates an example of an ontology of reasons. The requirements for an ontology vary based on the service and in which country it is used. In FIG. 3, one example is explained in more detail, relating to private information. The textual content 300 is first classified into a proper 301 or improper 302 class. The reasons are typically needed only for the improper classification; however, in some applications it may be beneficial to know why the textual input was classified as a proper one. In the example of FIG. 3, the improper class is then divided into a plurality of categories, such as private information 303. The reason classifier then determines if the classification result was based on the presence of private information. For example, this could be an inappropriate use of a telephone number, an e-mail address or even names, when it is assumed that they should not be published in a comment. In some occasions, the determination is not easy because making a difference between private and public information is not easy. In some countries, disclosing any information about minors may be forbidden. Thus, if the reason classifier determines that the information is considered private, it can give a further explanation by selecting between private as such 304 or that the information relates to minors 305. Accordingly, similar classifications and more detailed explanations can be given for illegal, offensive, advertising, violent, cultural conflict related and fake textual contexts. The example shown in FIG. 3 is not exhaustive and there may be more categories and reasons, depending on the geographical restrictions or just because the social media service operator wants to have particular reasons available.

As explained above, the arrangements using text classification as described above may be implemented in hardware, such as a mobile telephone, tablet computer, computer, telecommunication network base station or any other network connected device, or as a method. The method may be implemented as a computer program. The computer program is then executed in a computing device.

The apparatus, such as an apparatus for text classification, is configured to perform one of the methods described above. The apparatus comprises necessary hardware components. These may include at least one processor, at least one memory, at least one network connection, a bus and similar. Instead of dedicated hardware components, it is possible to share, for example, memories or processors with other components or access at a cloud service, centralized computing unit or other resource that can be used over a network connection.

The apparatus for text classification and the corresponding method have been described in conjunction with various embodiments herein. However, other variations to the disclosed embodiments can be understood and effected by those skilled in the art in practicing the claimed invention from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

What is claimed is:

1. A method, comprising:
receiving a text input to be classified;

predicting, using a text classifier, a class of the text input, to obtain a prediction result;
extracting a context relevant to the prediction result by identifying the context relevant to the prediction result by selecting words of the text input that are relevant to the prediction result using an interpretive multi-head attention module configured to perform;
identifying a multi-head attention importance of individual words of the text input as a normalized aggregate over attention head weights from words to the prediction result,
determining an adversarial importance of the individual words, by each respective word of the text input, by removing the respective word in the text input and computing a prediction probability of the text input when the respective word is removed,
applying a gradient-based filter defined as a normalized gradient for the individual words with respect to the prediction result, and
determining a weighted average of the multi-head attention importance, the adversarial importance, and the normalized gradient to generate the extracted context;
determining one or more reasons for the prediction result based on the extracted context, wherein the one or more reasons explain why the text input was classified into the predicted class; and
providing the prediction result and the determined one or more reasons as a classification result.

2. The method according to claim 1, wherein determining the one or more reasons for the prediction result comprises:
determining, using a machine learning arrangement, the one or more reasons for the prediction result based on the identified context, using a reason classifier and a knowledge base configured to be used to predict a reason for classification.

3. The method according to claim 2, wherein predicting the reason for classification comprises expanding the identified context using a knowledge base comprising semantical relationships of words.

4. The method according to claim 1, further comprising computing a value representing a confidence of the prediction result and the determined one or more reasons.

5. The method according to claim 4, further comprising:
comparing the computed value against a threshold; and
forwarding the text input, the prediction result, and the one or more reasons to a system operator when the computed value is lower than the threshold.

6. The method according to claim 1, further comprising generating an explanation based on the one or more reasons.

7. The method according to claim 1, wherein the text classifier is a language-representation based neural network.

8. An apparatus, comprising:
processing circuitry configured to:
receive a text input to be classified;
predict, using a text classifier, a class of the text input, to obtain a prediction result;
extract a context relevant to the prediction result by identifying the context relevant to the prediction result by selecting words of the text input that are relevant to the prediction result using an interpretive multi-head attention module, wherein the interpretive multi-head attention module is configured to:
identify a multi-head attention importance of individual words of the text input as a normalized aggregate over attention head weights from words to the prediction result,
determine an adversarial importance of the individual words, by each respective word of the text input, by removing the respective word in the text input and computing a prediction probability of the text input when the respective word is removed,
apply a gradient-based filter defined as a normalized gradient for the individual words with respect to the prediction result, and
determine a weighted average of the multi-head attention importance, the adversarial importance, and the normalized gradient to generate the extracted context;
determine one or more reasons for the prediction result based on the extracted context, wherein the one or more reasons explain why the text input was classified into the predicted class; and
provide the prediction result and the determined one or more reasons as a classification result.

9. The apparatus according to claim 8, wherein the processing circuitry is configured to determine the one or more reasons for the prediction result by determining, using a machine learning arrangement, the one or more reasons for the prediction result based on the identified context and using a reason classifier and a knowledge base configured to be used to predict reasons for classification.

10. The apparatus according to claim 8, wherein the processing circuitry is further configured to:
expand the identified context using a knowledge base comprising semantical relationships of words.

11. The apparatus according to claim 8, wherein the processing circuitry is further configured to:
compute a value representing a confidence of the prediction result and the determined one or more reasons.

12. The apparatus according to claim 11, wherein the processing circuitry is further configured to:
compare the computed value against a threshold; and
forward the text input, the prediction result, and the one or more reasons to a system operator when the computed value is lower than the threshold.

13. The apparatus according to claim 8, wherein the processing circuitry is further configured to generate an explanation based on the one or more reasons.

14. An apparatus, comprising:
at least one processor; and
a non-transitory computer readable storage medium storing a program that is executable by the at least one processor, the program including instructions to:
receive a text input to be classified;
predict, using a text classifier, a class of the text input, to obtain a prediction result;
extract a context relevant to the prediction result by identifying the context relevant to the prediction result by selecting words of the text input that are relevant to the prediction result using an interpretive multi-head attention module, wherein the interpretive multi-head attention module is configured to:
identify a multi-head attention importance of individual words of the text input as a normalized aggregate over attention head weights from words to the prediction result,
determine an adversarial importance of the individual words, by each respective word of the text input, by removing the respective word in the text input and computing a prediction probability of the text input when the respective word is removed, apply a gradient-based filter defined as a normalized gradient for the individual words with respect to the prediction result, and determine a weighted average of the multi-head attention importance, the adversarial importance, and the normalized gradient to generate the extracted context;

determine one or more reasons for the prediction result based on the extracted context, wherein the one or more reasons explain why the text input was classified into the predicted class; and provide the prediction result and the determined one or more reasons as a classification result.

15. The apparatus according to claim 14, wherein the program includes instructions to determine the one or more reasons for the prediction result by determining, using a machine learning arrangement, the one or more reasons for the prediction result based on the identified context and using a reason classifier and a knowledge base configured to be used to predict reasons for classification.

16. The apparatus according to claim 14, wherein the program further includes instructions to:

expand the identified context using a knowledge base comprising semantical relationships of words.

17. The apparatus according to claim 14, wherein the program further includes instructions to:

compute a value representing a confidence of the prediction result and the determined one or more reasons.

* * * * *